United States Patent
Goldstein et al.

(10) Patent No.: US 6,862,552 B2
(45) Date of Patent: Mar. 1, 2005

(54) METHODS, APPARATUS, AND SYSTEMS EMPLOYING SOFT DECISION DECODING

(75) Inventors: Yuri Goldstein, Southbury, CT (US); Yuri Okunev, Southbury, CT (US)

(73) Assignee: PCTEL, Inc., Milipitas, CA (US)

( * ) Notice: Subject to any disclaimer, the term of this patent is extended or adjusted under 35 U.S.C. 154(b) by 59 days.

(21) Appl. No.: 10/342,519

(22) Filed: Jan. 15, 2003

(65) Prior Publication Data

US 2004/0136313 A1 Jul. 15, 2004

(51) Int. Cl.[7] .............................................. G06F 15/04
(52) U.S. Cl. ..................... 702/179; 702/177; 702/182; 702/183; 702/189
(58) Field of Search ................................. 702/122, 125, 702/177, 179, 182, 183, 46, 57, 62, 68, 74, 79; 370/503; 375/354, 150; 700/83; 708/409; 709/238

(56) References Cited

U.S. PATENT DOCUMENTS

| | | | |
|---|---|---|---|
| 2002/0034191 A1 | * | 3/2002 | Shattil .......................... 370/464 |
| 2002/0061012 A1 | * | 5/2002 | Thi et al. ..................... 370/352 |
| 2003/0086366 A1 | * | 5/2003 | Branlund et al. ............ 370/208 |

OTHER PUBLICATIONS

Arun's LDPC toolkit for MATLAB, May 5, 2002, http://arun-10.tripod.com/ldpc/ldpc.htm, pp. 1–2.*
BPSK Basis, Max Carter, Nov. 1990, http://www.isd.net/lyle/watsbpsk.htm, pp. 1–8.*
IEEE, BPSK Modulation for IEEE 802.16 WirelessMAN OFDM, Mar. 12, 2004, pp. 1–14.*
IEEE Standard 802.11a–1999, Part11, §§ 17.1 through 17.1.2.4, Wireless LAN Medium Access Control (MAC) and Physical Layer (PHY) specifications, High–speed Physical Layer in the 5 GHz Band.
IEEE Standard 802.16ab, Part 16, §§ 8.3.5 through 8.3.5.1.5, Standard Air Interface for Fixed Broadband Interface for Fixed Broadband Wireless Access Systems—Media Access Control Modifications and Additional Physical Layer for 2–11 GHz.
Chapter 8, §8.5.1 of the textbook entitled "Turbo Coding for Fading Channels" by B.Vucetic and J. Yuan, Kluwer Academic Publishers, 2001.

* cited by examiner

Primary Examiner—Patrick Assouad
Assistant Examiner—Felix Suarez
(74) Attorney, Agent, or Firm—Gordon & Jacobson, PC

(57) ABSTRACT

An easily implementable soft decision decoding (SDD) metric is provided for telecommunications systems and apparatus. The SDD metric is based on weighted average distances or weighted minimum distances between scaled received signals and all reference signals related to the corresponding binary symbol. An important property of the SDD metric of the invention is that the distance weight is completely defined by the received signal scaling factor which is readily available as a result of conventional frequency domain equalization procedures. The invention is particularly advantageous in wireless systems having variable parameters such as wireless OFDM systems with selective fading.

47 Claims, 15 Drawing Sheets

FIG. 1
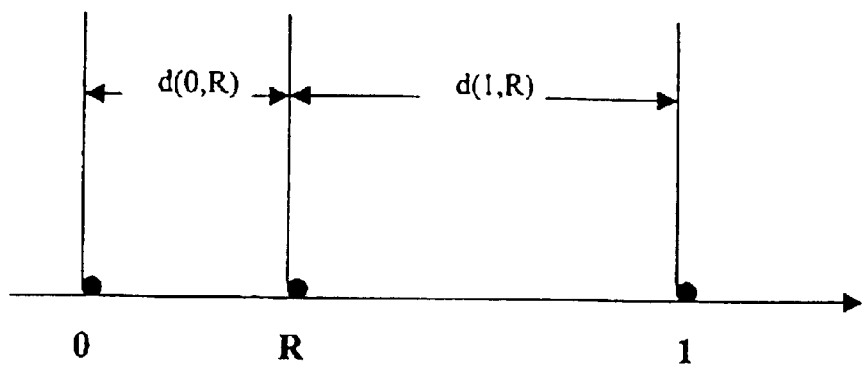
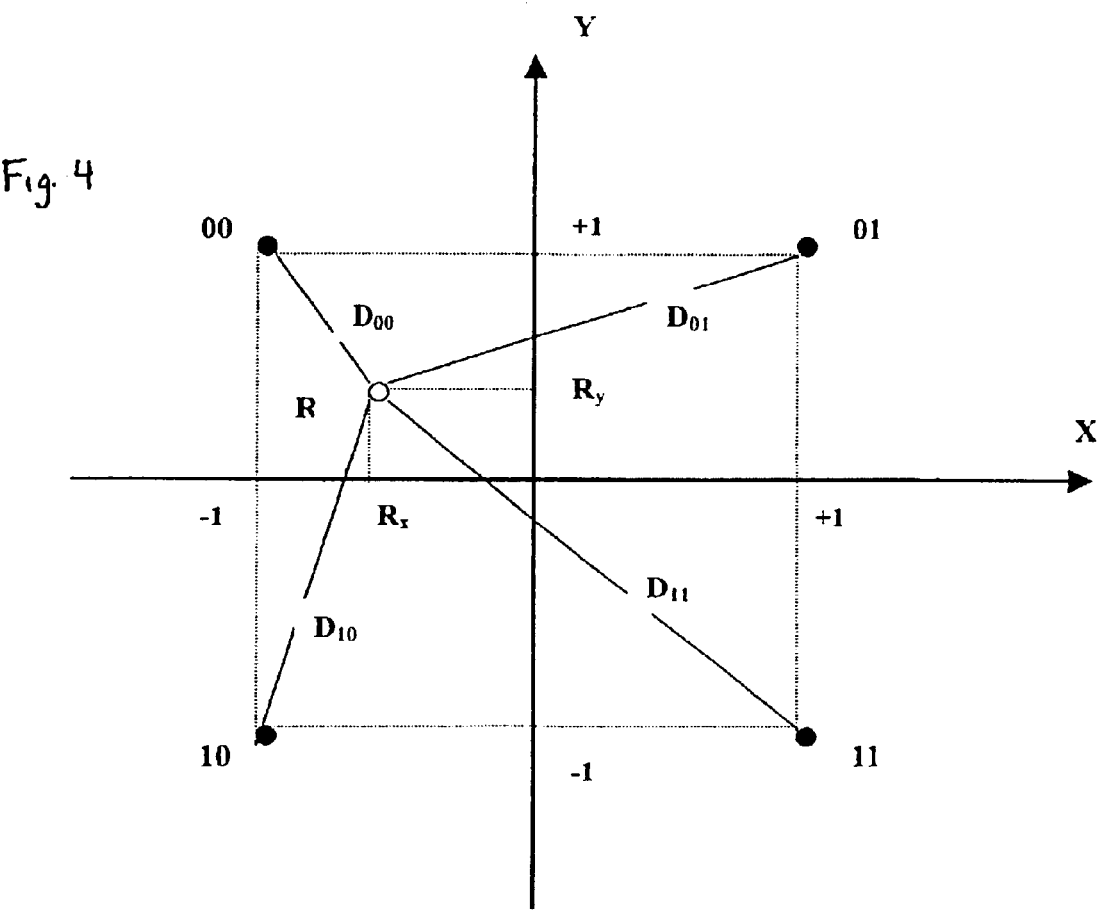
Fig. 4

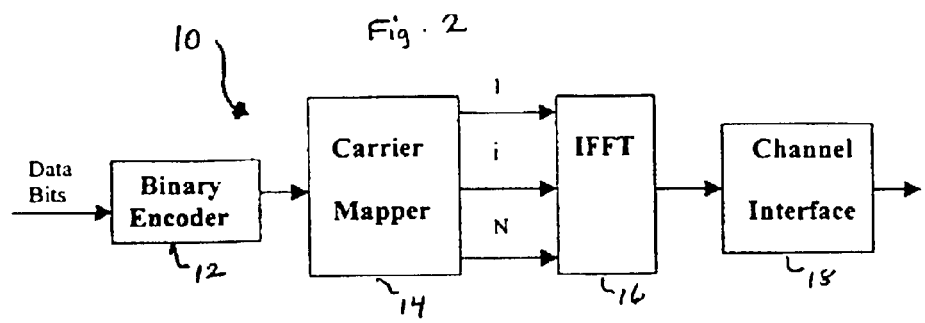
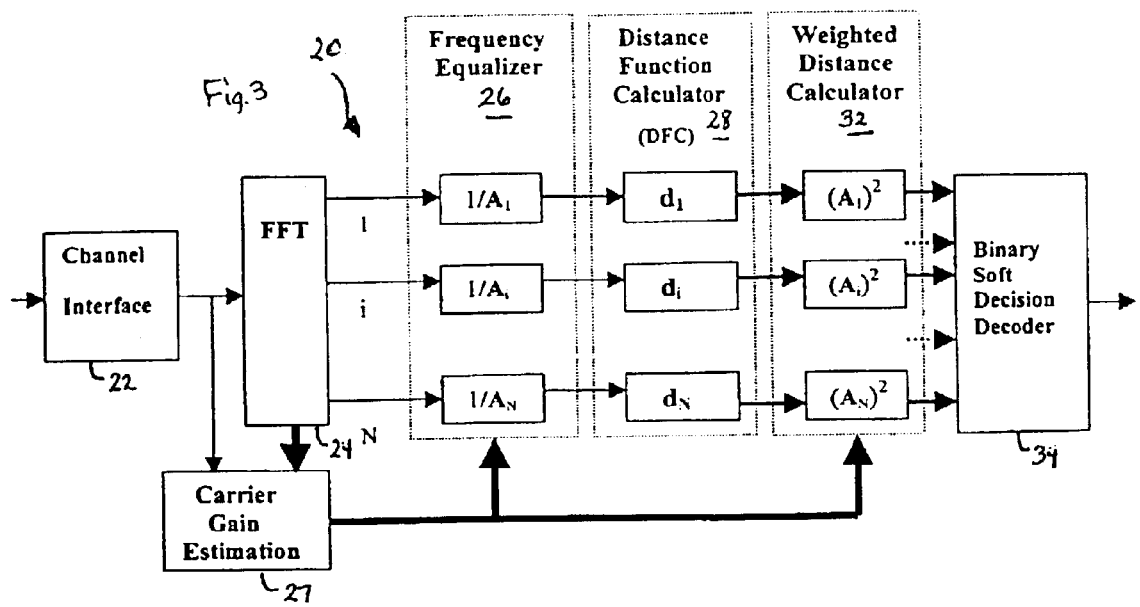

METHODS, APPARATUS, AND SYSTEMS EMPLOYING SOFT DECISION DECODING

BACKGROUND OF THE INVENTION

1. Field of the Invention

The present invention relates to telecommunications. More particularly, the present invention relates to soft decision decoding (SDD) algorithms for wireless or wired digital telecommunication systems having variable parameters and/or selective fading.

2. State of the Art

Digital telecommunication systems typically contain transmitters and receivers. Error control coding is an important procedure of the transmission process, and an error control codec is an important part of the system. The codec consists of an encoder in the transmitter and a decoder in the receiver.

There are different error correction and error detection codes, and each of them can be decoded with several decoding algorithms. Two major classes of decoding algorithms are: hard decision decoding (HDD) and soft decision decoding (SDD) algorithms. According to HDD, the receiver first determines the identity of each transmitted symbol (maybe erroneously), i.e., the receiver makes hard decision. Then, the sequence of received symbols are decoded; i.e., the decoder determines a corrected sequence of the transmitted symbols. In contrast, according to SDD, the receiver first estimates some measure of reliability of each possible decision without making decisions about the transmitted symbol at all; i.e., the decoder makes a soft decision. Then a sequence of estimated reliabilities (soft decisions) are decoded so that the decoder determines a corrected sequence of the transmitted symbols.

HDD and SDD approaches are generally illustrated in FIG. 1, where transmitted binary signals are shown as points "0" and "1", and the received signal as point R. When using HDD, the receiver makes decision in favor of point 0, because the received signal R is closer to point 0 than to point 1, and this hard decision 0 will be used in the HDD decoder. When using SDD, the receiver does not make hard decision at all, but calculates two distances d(0,R) and d(1,R) between the received signal R and reference signals 0 and 1, respectively. Distances d(0,R) and d(1,R) may serve as measure of reliability of the received signal. If, for example, d(0,R)=d(1,R), the received symbol is completely unreliable; i.e., it does not bear any information about the transmitted signal. On the other hand, if d(0,R) or d(1,R) is close to zero, the received symbol is very reliable. Soft decisions d(0,R) and d(1,R) or their combination will be further used in the SDD decoder.

Historically, HDD was the first decision coding technique utilized because its implementation is much easier than the SDD implementation. However, it was well known that SDD could provide much better performance in terms of bit error rate. Presently, SDD is the more commonly utilized decoder implementation because it is the most efficient way to achieve the highest data rate with required performance. SDD is used in wired ADSL systems (i.e.G.992.1), in wireless local area network (WLAN) systems (IEEE 802.11a standard), in wireless local loop (WLL) systems (IEEE 802.16 standard) and other wired and wireless applications. It is also recommended for future 3G and 4G wireless mobile systems, possibly, in combination with Orthogonal Frequency Division Multiplexing (OFDM) and Multi-input-Multi-output (MIMO) technologies.

Measurement of the received symbol reliability; i.e., the SDD metric, is used with different decoding algorithms such as the Viterbi algorithm for convolution codes, the Soft Output Viterbi algorithm (SOVA) for Turbo codes, and iterative probabilistic algorithms for LDPC and Turbo codes. In any case, a problem remains in finding an appropriate SDD metric, which, on the one hand, provides the optimal decoding, and, on the other hand, can be easily implemented.

In an additive white Gaussian noise (AWGN) channel with constant parameters, the best SDD metric is based on Euclidean distances between the received signal and reference signals. For channels with variable parameters such as radio channels with selective fading, squared distances between the received signal and properly scaled reference signals are recommended in the literature as the optimal SDD metric. See, e.g., B. Vucetic, J. Yuan, "Turbo codes", section 8.5.1, Kluwer Academic Publishers, 2001. This approach, however, is difficult to implement because it requires scaling of all reference signals for each received signal element, for example, for each carrier in an orthogonal frequency division multiplexed (OFDM) system. Therefore, as a rule, in practice for AWGN channels, a simplified metric is used which is based on distances between the properly scaled received signal and reference signals. This metric however is not optimal for selective fading channels.

SUMMARY OF THE INVENTION

It is therefore an object of the invention to provide a useful soft decision decoding metric.

It is a further object of the invention to provide a SDD metric which is easily implementable.

It is another object of the invention to provide a SDD metric which is useful for selective fading channels.

It is an additional object of the invention to provide methods, apparatus, and systems which utilize an easily implementable SDD metric which is optimized for selective fading channels.

In accord with the objects of the invention which will be discussed in detail below, an easily implementable SDD metric is provided for telecommunications systems and apparatus which is based on weighted average distances or weighted minimum distances between scaled received signals and all reference signals related to the corresponding binary symbol. An important property of the SDD metric of the invention is that the distance weight is completely defined by the received signal scaling factor which is readily available as a result of conventional frequency domain equalization procedures. The invention is particularly advantageous in wireless systems having variable parameters such as wireless OFDM systems with selective fading.

Additional objects and advantages of the invention will become apparent to those skilled in the art upon reference to the detailed description taken in conjunction with the provided figures.

BRIEF DESCRIPTION OF THE DRAWINGS

FIG. 1 is a schematic useful in understanding hard decision decoding and soft decision decoding techniques.

FIG. 2 is a simplified block diagram of an OFDM transmitter of the invention.

FIG. 3 is a simplified block diagram of an OFDM receiver of the invention.

FIG. 4 is a plot useful in understanding the distance function calculation procedure carried out by the OFDM receiver of FIG. 3.

DETAILED DESCRIPTION OF THE PREFERRED EMBODIMENTS

Figure 5:
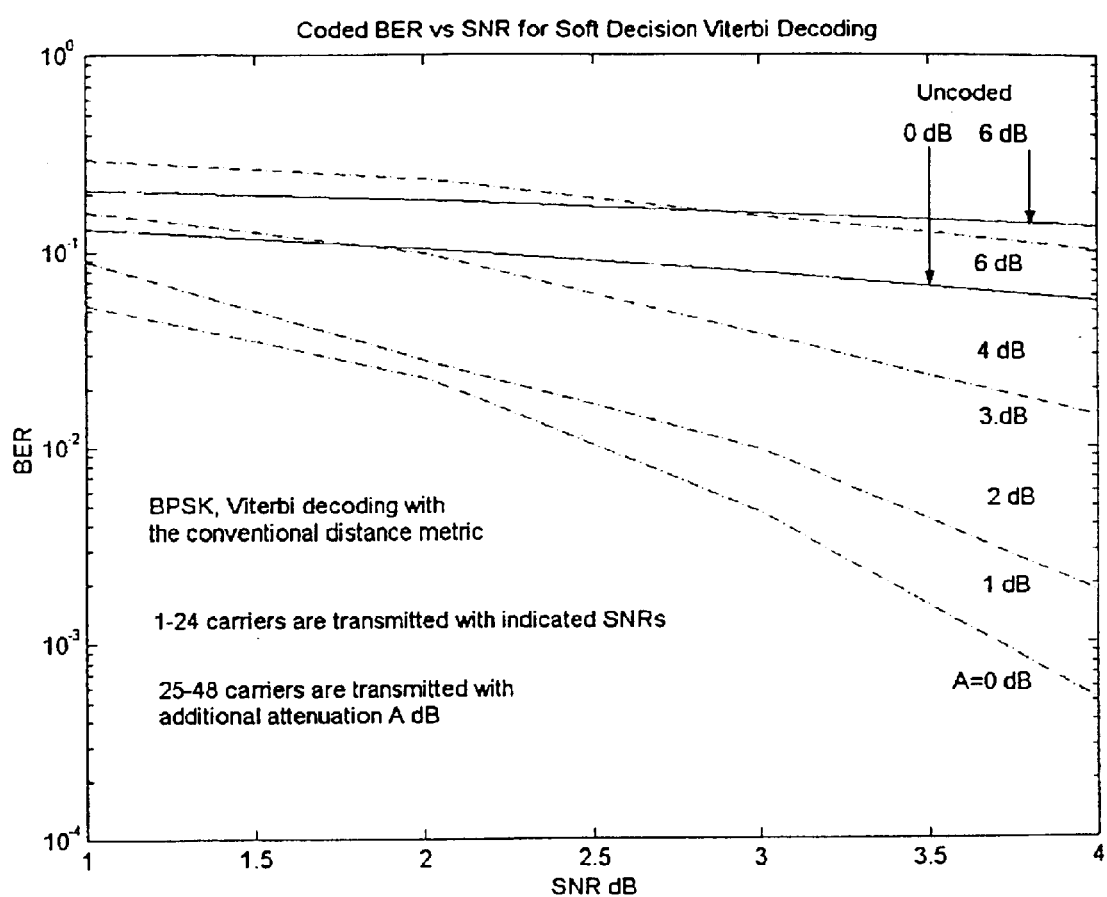
FIG. 5 shows bit error rate (BER) versus signal noise ratio (SNR) for BPSK modulation and the unweighted distance metric with 1, 2, 3, 4 and 6 dB attenuation.

Turning to FIG. 2, a simplified block diagram of the transmitter 10 of the invention is seen. The block diagram of FIG. 2 contains only those elements that are significant for the proposed functionality of the invention, and all other unessential elements such as timing, synchronization, interleaving, scrambling, bit-loading, prefix-inserting, filtering, HF modulation, etc. are not shown. As seen in FIG. 2, data bits, reflecting any type of digitized information, are fed to the input of a binary encoder 12, which may be, for example, a convolution encoder, a Turbo code encoder or an LDPC encoder. The binary encoder 12 encodes the bits, and the coded bits are then provided to a carrier/mapper 14 which combines them into one or more binary combinations and maps them into PSK or QAM symbols. In OFDM systems, each carrier is modulated by some complex number corresponding to an M-ary PSK or QAM symbol. The carrier/mapper 14 produces N complex numbers (1 ... i ... N) in parallel at its output, where N is the number of orthogonal carriers of the system. These N numbers are fed to the parallel input of an IFFT (Inverse Fast Fourier Transform) unit 16, which calculates signal samples in the time domain. The signal samples in the time domain are fed to a channel interface 18 which matches the transmitted signal with the channel. In the case of a wireless system, the channel interface 18 includes a D/A converter, a HF modulator, a power amplifier and an antenna system or air interface (all not shown).

FIG. 3 shows a simplified block-diagram of the receiver 20 of the invention. As in the transmitter, the channel interface 22 serves for matching a channel with the baseband processing unit. In the case of wireless system the channel interface 22 includes an antenna, a low-noise amplifier, a HF converter, filters, a demodulator, and some other units presently unessential for consideration (all not shown). The Fast Fourier Transform (FFT) 24 is a conventional part of any OFDM system. It calculates two numbers X and Y for each carrier which are coordinates of the received signal point in two-dimensional space, or real and imaginary parts of a complex number which reflect carrier phase and amplitude. So, for an N-carrier system, the FFT block calculates N pairs of numbers:

$$X_{Fi}, Y_{Fi}; i=1,2,\ldots, N. \quad (1)$$

The N pairs of numbers are fed to a frequency equalizer 26, which adjusts the numbers $X_{Fi}$, $Y_{Fi}$ to reference signals in such a way that without noise the received signal is equal to one of the reference signals (i.e., the ideal points of the constellation). This procedure includes amplitude adjustment and phase adjustment. As a result of phase adjustment, coordinates $X_{Fi}$, $Y_F$ are transformed into a new pair of coordinates $X_i$, $Y_i$, and as a result of amplitude adjustment by the frequency equalizer 26 they are transformed into a final pair of coordinates:

$$X_i/A_i, Y_i/A_i; i=1,2,\ldots, N, \quad (2)$$

where $A_i$ is a scaling factor for the i'th carrier, which (in the considered case) is equal to channel gain (i.e., the transfer coefficient from the output of the mapper 14 in the transmitter 10 to the output of the FFT 24 in the receiver 20) for the i'th carrier. In FIG. 3, phase adjustment in the frequency domain equalizer has not been shown because phase adjustment is unessential for the invention, whereas amplitude adjustment by means of dividing the FFT transforms by scaling factors $A_i$ has been shown because it is essential to the invention.

The set of scaling factors $A_i$ is usually defined by the carrier gain estimation unit 27. As seen in FIG. 3, this unit can receive signals which are input to and output from the FFT 24, and it can use for scaling factor estimation both special training signals (preamble) and information signals. The carrier gain estimation unit 27 is not specific to this invention in the sense that it is conventionally used in any OFDM system. Therefore, details of the carrier gain estimation unit 27 are not further described.

The next step of signal processing according to the invention is calculation of some function of distances between the scaled received signals and reference signals, hereinafter referred to as a "distance function". If the carriers are modulated with M-ary symbols, then the distance function calculator (DFC) 28 according to one embodiment of the invention calculates a distance function for each binary digit in the binary combination corresponding to the received M-ary symbol, i.e., it calculates $\log_2 M$ pairs of distance functions. Two distance functions are usually used: an average distance (or average squared distance) and a minimum distance (or minimum squared distance), as these distance functions provide close to an optimum soft decision metric.

The procedure of distance function calculation is explained by a simple example of 4-ary QAM modulation, as shown in FIG. 4. FIG. 4 shows four reference signals in two-dimensional space (X,Y) for one of the OFDM carriers. The reference signals, designated by big black dots, correspond to two digit binary combinations 00, 01, 10, and 11 with coordinates (−1,1), (1,1), (−1,−1) and (1,−1), correspondingly. If it is assumed that the receiver 20 receives a signal R on the i'th carrier (big white dot), which after FFT and frequency equalization according to equation (2) has coordinates $R_x=X_i/A_i$ and $R_y=Y_i/A_i$, then the squared Euclidean distances between the received signal R and references signals are:

$$D_{00}=(R_x+1)^2+(R_y-1)^2;$$
$$D_{01}=(R_x-1)^2+(R_y-1)^2;$$
$$D_{10}=(R_x+1)^2+(R_y+1)^2;$$
$$D_{11}=(R_x-1)^2+(R_y+1)^2. \quad (3)$$

In practice, squared Euclidean distances are calculated instead of Euclidean distances, but for simplicity squared distances are usually called distances. Therefore, the terms "distance" instead of "squared distance", "average distance" instead of "average squared distance", and "minimum distance" instead of "minimum squared distance" will be used herein as well.

Returning to FIG. 3, after calculating distances according to equation (3), the DFC 28 calculates two distance functions for each bit in binary combination. In the example, binary combinations consist of two bits. So, the DFC unit calculates four distance functions for each carrier. If the distance function is an average distance, then the DFC 28 calculates the following four numbers for each carrier:

$$Av\_d_{10}=(D_{00}+D_{01})/2;$$

$$Av\_d_{11}=(D_{10}+D_{11})/2$$

$$Av\_d_{20}=(D_{00}+D_{10})/2;$$

$$Av\_d_{21}=(D_{01}+D_{11})/2; \qquad (4)$$

where $Av\_d_{b0}$ (b=1,2) is an average distance between the received scaled signal and reference signals (constellation points) containing a value 0 in the b'th bit of the binary combination; and $Av\_d_{b1}$ (b=1,2) is an average distance between the received scaled signal and reference signals (constellation points) containing a value 1 in the b'th bit of the binary combination. On the other hand, if the distance function is a minimum distance, then the DFC 28 calculates the following four numbers for each carrier:

$$Min\_d_{10}=D_{00};$$

$$Min\_d_{11}=D_{10};$$

$$Min\_d_{20}=D_{00};$$

$$Min\_d_{21}=D_{01}; \qquad (5)$$

where $Min\_d_{b0}$ is a minimum distance between the received-scaled signal and reference signals (constellation points) containing a value 0 in the b'th bit of the binary combination; and $Min\_d_{b1}$ is a minimum distance between the received-scaled signal and reference signals (constellation points) containing a value 1 in the b'th bit of the binary combination.

According to the invention, the average distances according to equation (4) or minimum distances according to equation (5) are fed from the DFC 28 to the weighted distance calculator 32, where each distance function is multiplied by a corresponding weight coefficient, which is a squared scaling factor for the corresponding carrier $(A_i)^2$, where $A_i$ is a gain or attenuation coefficient known after the frequency equalization process is completed. Finally, the weighted average distances $$(A_i)^2*Av\_d_{10}, (A_i)^2*Av\_d_{11}, (A_i)^2*Av\_d_{20}, (A_i)^2*Av\_d_{21}. \qquad (6)$$

or weighted minimum distances $$(A_i)^2*Min\_d_{10}, (A_i)^2*Min\_d_{11}, (A_i)^2*Min\_d_{20}, (A_i)^2*Min\_d_{21}(7)$$

are used in a binary soft decision decoder 34 as the soft decision metric.

In the receiver of FIG. 3, the weight coefficients are equal to scaling factors for the carriers, which is essentially a transfer coefficient from the output of the mapper 14 in the transmitter 10 of FIG. 2 to the output of the FFT 24 of the receiver 20 of FIG. 3. In the general case, the weight coefficients depend on a channel model. As is shown below, weight coefficients may be inverse noise PSDs (power spectral densities) or carrier SNRs (signal-to-noise ratios). In any case, the essence of the invention is not changed; i.e., the received signal is scaled (by the frequency equalizer 26), and the distance function between the scaled signals and the reference signals for each bit (as calculated by the distance function calculator 28) are weighted (by the weighted distance calculator 32) such that the weighted distance function is used in the soft decision decoder 34.

The weighted metric of the invention is simple to implement, particularly, when weighted minimum distances are utilized. However, in the case of a multipoint constellation, for example, 16-QAM, 64-QAM, 256-QAM, finding the minimum distance requires a substantial number of computations. In particular, if the constellation has $M=2^k$ points, where k is an integer, then a direct approach requires computation of M/2 distances to find the minimum distance for bit 1, and the same number of computations for bit 0. This procedure must then be repeated k times. As a result, the procedure needs k*M distance computations and almost the same number of comparisons for finding the minimum distance. For example, for 64-QAM the procedure requires 6*64=384 distance computations.

To decrease the number of computations, and according to another aspect of the invention, a method of finding minimum distances is provided which is based on tabulating in advance the coordinates of the closest constellation points. This aspect of the invention may be explained with the same simple example of 4-QAM modulation. In this case, according to equation (7), the following four minimum distance must be computed.

$$Min\_d_{10}, Min\_d_{11}, Min\_d_{20}, Min\_d_{21}. \qquad (8)$$

The direct approach to finding the four minimum distances requires computation of two distances for each minimum. Indeed, in order to find $Min\_d_{21}$, distances $D_{01}$ and $D_{11}$ (see FIG. 4) must be calculated and the minimum one of the two selected the minimum. So, the procedure according to the direct approach requires eight computations. On the other hand, it can be seen with reference to FIG. 4, that, if signal R has been received, one does not need to calculate both $D_{01}$ and $D_{11}$ in order to find $Min\_d_{21}$, because for any received signal which is closer to reference signal 00, distance $D_{01}$ will be definitely less than distance $D_{11}$. This observation allows one to compose in advance the coordinates of the closest constellation points and decrease the number of computations.

The proposed tabulated-in-advance coordinates for 4-QAM are shown in Table 1:

TABLE 1

| 1<br>Address of the nearest<br>constellation point | 2<br>$Min\_d_{10}$ | 3<br>$Min\_d_{20}$ | 4<br>$Min\_d_{11}$ | 5<br>$Min\_d_{21}$ |
| --- | --- | --- | --- | --- |
| 00 | −1, 1 | −1, 1 | −1, −1 | 1, 1 |
| 01 | 1, 1 | −1, 1 | 1, −1 | 1, 1 |
| 10 | −1, 1 | −1, −1 | −1, −1 | 1, −1 |
| 11 | 1, 1 | −1, −1 | 1, −1 | 1, −1 |

The first column of Table 1 contains an address of a constellation point, which is the closest one to the received signal, with the addresses coinciding with binary representations of the constellation points. The second column of Table 1 shows coordinates x,y of the nearest to the received signal constellation point having a 0 in the first bit. The third column of Table 1 shows coordinates x,y of the nearest to the received signal constellation point having a 0 in the second bit. The fourth column of Table 1 shows coordinates x,y of the nearest to the received signal constellation point having a 1 in the first bit. The fifth column of Table 1 shows coordinates x,y of the nearest to the received signal constellation point having a 1 in the second bit.

The minimum distances are calculated as follows: first, the address of the constellation point nearest to the received signal is determined; second, minimum distances according to equation (8) are calculated as distances between the received signal and constellation points with coordinates, indicated in the corresponding row and column of Table 1.

Those skilled in the art will appreciate that by using the table as opposed to the "direct approach", the number of computations required for finding minimum distances is reduced from eight to four. This number can be further reduced to three, because some coordinates are repeated. The repeated coordinates are indicated in Table 1 with a bold font. The last reduction in computation, however, needs additional intelligence for finding cases which have the same ideal coordinates. This may not, however, result in greater efficiency of the algorithm as it trades comparisons for computations.

An example of a table for a 16-QAM constellation used in the IEEE 802.11a standard, is shown in Table2.

TABLE 2

| 1 Address | 2 $d_{10}$ | 3 $d_{20}$ | 4 $d_{30}$ | 5 $d_{40}$ | 6 $d_{11}$ | 7 $d_{21}$ | 8 $d_{31}$ | 9 $d_{41}$ |
|---|---|---|---|---|---|---|---|---|
| 0000 | −3, −3 | −3, −3 | −3, −3 | −3, −3 | 1, −3 | −1, −3 | −3, 1 | −3, −1 |
| 0001 | −3, −1 | −3, −1 | −3, −1 | −3, −3 | 1, −1 | −1, −1 | −3, 1 | −3, −1 |
| 0010 | −3, 3 | −3, 3 | −3, −1 | −3, 3 | 1, 3 | −1, 3 | −3, 3 | −3, 1 |
| 0011 | −3, 1 | −3, 1 | −3, −1 | −3, 3 | 1, 1 | −1, 1 | −3, 1 | −3, 1 |
| 0100 | −1, −3 | −3, −3 | −1, −3 | −1, −3 | 1, −3 | −1, −3 | −1, 1 | −1, −1 |
| 0101 | −1, −1 | −3, −1 | −1, −1 | −1, −3 | 1, −1 | −1, −1 | −1, 1 | −1, −1 |
| 0110 | −1, 3 | −3, 3 | −1, −1 | −1, 3 | 1, 3 | −1, 3 | −1, 3 | −1, 1 |
| 0111 | −1, 1 | −3, 1 | −1, −1 | −1, 3 | 1, 1 | −1, 1 | −1, 1 | −1, 1 |
| 1000 | −1, −3 | 3, −3 | 3, −3 | 3, −3 | 3, −3 | 1, −3 | 3, 1 | 3, −1 |
| 1001 | −1, −1 | 3, −1 | 3, −1 | 3, −3 | 3, −1 | 1, −1 | 3, 1 | 3, −1 |
| 1010 | −1, 3 | 3, 3 | 3, −1 | 3, 3 | 3, 3 | 1, 3 | 3, 3 | 3, 1 |
| 1011 | −1, 1 | 3, 1 | 3, −1 | 3, 3 | 3, 1 | 1, 1 | 3, 1 | 3, 1 |
| 1100 | −1, −3 | 3, −3 | 1, −3 | 1, −3 | 1, −3 | 1, −3 | 1, 1 | 1, −1 |
| 1101 | −1, −1 | 3, −1 | 1, −1 | 1, −3 | 1, −1 | 1, −1 | 1, 1 | 1, −1 |
| 1110 | −1, 3 | 3, 3 | 1, −1 | 1, 3 | 1, 3 | 1, 3 | 1, 3 | 1, 1 |
| 1111 | −1, 1 | 3, 1 | 1, −1 | 1, 3 | 1, 1 | 1, 1 | 1, 1 | 1, 1 |

The meaning of the columns in Table 2 is the same as in Table 1. Thus, the second through fifth columns of Table 2 show coordinates x,y of the nearest to the received signal constellation points having a value 0 in the first through fourth bits respectively. The sixth through ninth columns of Table 2 show coordinates x,y of the nearest to the received signal constellation points having a value 1 in the first through fourth bits respectively.

According to Table 2, the minimum distances are calculated as follows: first, the address of the constellation point nearest to the received signal is determined, i.e., a row number in the table; second, minimum of distances $d_{10}$, $d_{20}$, $d_{30}$, $d_{40}$, $d_{11}$, $d_{21}$, $d_{31}$, $d_{41}$ are calculated as distances between the received signal and constellation points with coordinates indicated in the corresponding column of Table 2.

One skilled in the art will appreciate that by using the table as opposed to the direct approach, the number of computations for finding a minimum distance finding is reduced from 4*16=64 to eight. This number can be further reduced to five computations, because, as one can see from Table 2, some coordinates in each row are repeated four times. The last reduction, however, needs additional intelligence as previously described.

In the general case, the number of computations may be calculated as follows. The first part of the procedure which involves finding a constellation point nearest to the received signal (row address in the table) requires $\log_2 M = k$ operations of comparing. The second part of the procedure which involves finding minimum distances for each bit requires 2 k computations. So, in total, the procedure of this aspect of the invention requires no more than 3 k computations and comparisons. Comparing this number with the number of computations and comparisons for direct distance minimization (i.e., 2 kM) it will be appreciated that the computation gain of this aspect of the invention is not less than 2 kM/3 k=0.66 M.

While the invention thusfar has been described with respect to a typical channel model having AWGN and selective fading, a generalization and detailed theoretical description of the invention is provided below for different channel models.

An example of a system with variable signal power is the wireless OFDM system with selective fading where signals which are transmitted by different carriers may have different attenuation. Another example is an ADSL system where both signal power and noise spectral density depend on carrier frequency.

As a rule, soft decision decoding algorithms such as the Viterbi soft decision decoding algorithm, are based on maximum likelihood criteria, which are equivalent (in terms of error probability) to the maximum a posteriori probability (likelihood function) of a transmitted information sequence if the information sequences are equally likely. In turn, the likelihood function of the received signal sequence Sr when transmitting signal sequence St is:

$$P(Sr/St) = \prod_{i,j} P(Sr_i/St_{ij}), \quad (9)$$

where $P(Sr_i/St_{ij})$ is the conditional probability of receiving signal sequence $Sr_i$ when transmitting $St_{ij}$, $Sr_i$ is the i'th element (symbol) of the received signal sequence, and $St_{ij}$ is the j'th version of the i'th element (symbol) of the transmitted signal sequence (reference signal). Multiplications in equation (9) are performed through all i and j.

It is assumed that the attenuation coefficient for the i'th transmitted symbol (carrier), which includes both transmitter gain and channel loss is known and equals $A_i$. Then, the i'th element (symbol) of the received signal sequence is equal to $$Sr_i = A_i * St_i + n_i, \quad (10)$$

where $n_i$ is an additive noise.

In a channel with Gaussian noise, each component of equation (9) may be presented as follows:

$$P(Sr_i/St_{ij})=1/[\sigma_i(2\pi)^{1/2}]\exp[-d(Sr_i, A_i^*St_{ij})/2(\sigma_i)^2], \quad (11)$$

where d(x, y) is the squared Euclidean distance between signals "x" and "y" and $(\sigma_i)^2$ is the noise variance for the i'th signal symbol.

To simplify the decoding procedure the log likelihood criteria is usually used instead of the likelihood criteria:

$$\log P(Sr/St) = \log \prod P(Sr_i/St_{ij}) = \sum \log P(Sr_i/St_{ij}) = \quad (12)$$
$$\sum \log\{1/[\sigma_i(2\pi)^{\frac{1}{2}}]\exp[-d(Sr_i, A_i^*St_{ij})/2(\sigma_i)^2]\} =$$
$$\sum \log\{1/[\sigma_i(2\pi)^{\frac{1}{2}}]\} - d(Sr_i, A_i^*St_{ij})/2(\sigma_i)^2.$$

One can see from equation (12) that the maximum of logP(Sr/St) corresponds to the minimum of the last component of equation (12), so the general decoding algorithm is $$\min_{i,j} \sum d(Sr_i, A_i^*St_{ij})/(\sigma_i)^2. \quad (13)$$

Minimization in equation (13) is performed through all i and j.

The previous algorithm (equation 13) is a basis for utilization of the Euclidean metric d(x, y) in the conventional soft decision decoding algorithms, for example, in the Viterbi decoding procedure.

The general decoding algorithm of equation (13) may be considered for different non-stationary (moving) situations in a radio channel. In a first example, $A_i=A$, and $\sigma_i^2=\sigma^2$. This represents a situation where transmitted signal elements are equally attenuated (no selective fading) and all signal elements are subjected to noise with equal variances (white noise). In this case, the general decoding algorithm (13) can be presented as follows:

$$\min \Sigma d(Sr_i, A^*St_{ij}). \quad (14)$$

For binary systems, the soft decision metric corresponding to equation (14) has the following simple double expression:

$$d_{i0}=(X_i-A^*X_{i0})^2, \quad (15)$$
$$d_{i1}=(X_i-A^*X_{i1})^2, \quad (16)$$

where $X_i$ is the received signal coordinate, and $X_{i1}$ and $X_{i0}$ are reference signals coordinates corresponding to binary 1 and binary 0.

In two-dimensional PSK and QAM systems with binary encoding and binary decoding, for example, in the IEEE 802.11a standard with Viterbi binary decoding, the metric is more complex. In this more complex case there are two approaches to metric calculation, one based on average Euclidean distance and the other on minimum Euclidean distances. The average Euclidean distance metric is:

$$d_{ib0}=\Sigma(X_i-A^*X_{ib0})^2+(Y_i-A^*Y_{ib0})^2, \quad (17)$$
$$d_{ib1}=\Sigma(X_i-A^*X_{ib1})^2+(Y_i-A^*Y_{ib1})^2, \quad (18)$$

where $X_i$ and $Y_i$ are coordinates (for example, FFT transform) of the received signal (in this case index i corresponds, for example, to a carrier number); $X_{ib0}$ and $Y_{ib0}$ are coordinates of the PSK or QAM constellation points, corresponding to binary 0 in the b'th bit of the binary combination; and $X_{ib1}$ and $Y_{ib1}$ are coordinates of the PSK or QAM constellation points, corresponding to binary 1 in the b'th bit of the binary combination. The summation in equation (17) is performed for all reference constellation points containing a 0 in the b'th bit of the binary combination, and the summation in equation (18) is performed for all constellation points containing a 1 in the b'th bit of the binary combination. If a system uses an M-point constellation (M-QAM), then the sums of equations (17) and (18) contain M/2 components, and the soft decision decoder should calculate $B=\log_2 M$ pairs for each carrier.

The minimum Euclidean distance metric is determined as follows:

$$d_{ib0}=\min [(X_i-A^*X_{ib0})^2+(Y_i-A^*Y_{ib0})^2], \quad (19)$$
$$d_{ib1}=\min [(X_i-A^*X_{ib1})^2+(Y_i-A^*Y_{ib1})^2]. \quad (20)$$

Minimization in equation (19) is performed for all reference constellation points containing a 0 in the b'th bit of the binary combination, and minimization in equation (20) is performed for all constellation points containing al in the b'th bit of the binary combination. In this case, the soft decision decoder also should calculate $B=\log_2 M$ pairs for each carrier. However, the calculation of each pair for equations (19) and (20) is simpler than what is required for equations (17) and (18).

A second example of considering the general decoding algorithm of equation (13) in a non-stationary (i.e., average signal for channel changes in time) situation in a radio channel is where the transmitted signal elements are equally attenuated (no selective fading; $A_i=A$,), but where they are subjected to noise with different variances (colored noise). In this case the general decoding algorithm (13) can be presented as follows:

$$\min \Sigma d(Sr_i, A^*St_{ij})/(\sigma_i)^2. \quad (21)$$

For two-dimensional signals the corresponding soft decision metrics can be presented as follows. The average Euclidean distance metric is:

$$d_{ib0}=(1/\sigma_i)^2 * \Sigma(X_i-A^*X_{ib0})^2+(Y_i-A^*Y_{ib0})^2, \quad (22)$$
$$d_{ib1}=(1/\sigma_i)^2 * \Sigma(X_i-A^*X_{ib1})^2+(Y_i-A^*Y_{ib1})^2. \quad (23)$$

The minimum Euclidean distance metric is:

$$d_{ib0}=(1/\sigma_i)^2 * \min [(X_i-A^*X_{ib0})^2+(Y_i-A^*Y_{ib0})^2], \quad (24)$$
$$d_{ib1}=(1/\sigma_i)^2 * \min [(X_i-A^*X_{ib1})^2+(Y_i-A^*Y_{ib1})^2], \quad (25)$$

A third example of considering the general decoding algorithm of equation (13) in a non-stationary situation in a radio channel is where the transmitted signal elements have different attenuation, but they are subjected to noise with equal variances (white noise; $\sigma_i^2=\sigma^2$). This is the most typical case, corresponding to a channel with AWGN and frequency selective fading. In this case, the general decoding algorithm (13) can be presented as follows:

$$\min \Sigma d(Sr_i, A_i^*St_{ij}). \quad (26)$$

For two-dimension signals, the corresponding soft decision metrics can be presented as follows. The average Euclidean distance metric is:

$$d_{ib0}=\Sigma(X_i-A_i^*X_{ib0})^2+(Y_i-A_i^*Y_{ib0})^2, \quad (27)$$
$$d_{ib1}=\Sigma(X_i-A_i^*X_{ib1})^2+(Y_i-A_i^*Y_{ib1})^2; \quad (28)$$

The minimum Euclidean distance metric is:

$$d_{ib0}=\min \left[(X_i-A_i^*X_{ib0})^2+(Y_i-A_i^*Y_{ib0})^2\right], \quad (29)$$

$$d_{ib1}=\min \left[(X_i-A_i^*X_{ib1})^2+(Y_i-A_i^*Y_{ib1})^2\right]. \quad (30)$$

The metrics of equation (27), (28), (29) and (30) require scaling all constellation points (reference signals) for each received signal element and are difficult to implement. Therefore, for AWGN channels, the following simplified decoding algorithm (instead of equation (26)) is preferably used:

$$\min \Sigma d(Sr_i/A_i, St_{ij}). \quad (31)$$

For two-dimension signals the soft decision metrics corresponding to equation (31) can be presented as follows. The average Euclidean distance metric is:

$$d_{ib0}=\Sigma(X_i/A_i-X_{ib0})^2+(Y_i/A_i-Y_{ib0})^2, \quad (32)$$

$$d_{ib1}=\Sigma(X_i/A_i-X_{ib1})^2+(Y_i/A_i-Y_{ib1})^2; \quad (33)$$

The minimum Euclidean distance metric is:

$$d_{ib0}=\min \left[(X_i/A_i-X_{ib0})^2+(Y_i/A_i-Y_{ib0})^2\right], \quad (34)$$

$$d_{ib1}=\min \left[(X_i/A_i-X_{ib1})^2+(Y_i/A_i-Y_{ib1})^2\right]. \quad (35)$$

It will be appreciated by those skilled in the art that equations (32)–(35) are based on an unweighted Euclidean metric $d(Sr_i/A_i, St_{ij})$, which is not optimal for selective fading channels. However, according to the preferred embodiment of the invention, weighted Euclidean metrics are utilized for soft decision decoding and are therefore considered below.

As a rule, PSK and QAM demodulators use scaling the received signal instead of scaling constellation points. This scaling procedure is based on the frequency equalization procedure, which, in turn, is a part of the conventional coherent processing algorithm. The scaling procedure leads to preferably changing the decoding algorithm and soft decision metrics. According to the preferred embodiment of the invention, the received signal is transformed into scaled received signal $Sr_isc$:

$$Sr_isc=Sr_i/A_i=St_i+n/A_i. \quad (36)$$

The scaled signal according to equation (36) contains modified noise $n/A_i$. If the channel noise "n" has dispersion $\sigma^2$, then the dispersion of the modified noise for the i'th symbol is equal to $$D_{i-\sigma}{}^2/(A_i)^2. \quad (37)$$

So, this case with attenuated symbols is transformed into a case with not attenuated symbols but with colored noise. As a result, the basic log likelihood function is transformed as follows:

$$\log P(Sr/St)=\Sigma\log\{1/[((\sigma^2/A_i^2)2\pi)^{1/2}]\}-\Sigma d(Sr_i sc, St_{ij})/2[\sigma^2/A_i^2], (38)$$

and the decoding algorithm is $$\min \sum_{i,j} d(Sr_i sc, St_{ij})*(A_i)^2. \quad (39)$$

On the basis of the above consideration, a weighted Euclidean metric for PSK and QAM systems with binary trellis encoding and binary Viterbi decoding is provided.

Two versions of the metric are the average weighted Euclidean distance metric:

$$d_{ib0}=(A_i)^2*\Sigma(X_i/A_i-X_{ib0})^2+(Y_i/A_i-Y_{ib0})^2, \quad (40)$$

$$d_{ib1}=(A_i)^2*\Sigma(X_i/A_i-X_{ib1})^2+(Y_i/A_i-Y_{ib1})^2; \quad (41)$$

and the minimum weighted Euclidean distance metric:

$$d_{ib0}=(A_i)^2*\min \left[(X_i/A_i-X_{ib0})^2+(Y_i/A_i-Y_{ib0})^2\right], \quad (42)$$

$$d_{ib1}=(A_i)^2*\min \left[(X_i/A_i-X_{ib1})^2+(Y_i/A_i-Y_{ib1})^2\right]. \quad (43)$$

Returning now to the case where the transmitted signal elements have different attenuation (selective fading) and are subjected to noise with different variances (colored noise); i.e., $A_i=A$, and $\sigma_i=\sigma^2$, assume again that the received signal $Sr_i$ is transformed into the scaled received signal $Sr_i sc$:

$$Sr_i sc=Sr_i/A_i=St_i+n_i/A_i. \quad (44)$$

The scaled signal of equation (44) contains modified noise $n_i/A_i$ with variance $(\sigma_i)^2/(A_i)^2$. As a result, the decoding algorithm is $$\min \sum_{i,j} d(Sr_i / A_i, St_{ij})*[(A_i)^2/(\sigma_i)^2] \quad (45)$$

In equation (45), the coefficient in the square brackets is proportional to the signal-to-noise ratio for the i'th signal symbol $SNR_i$:

$$SNR_i=C*[(A_i)^2/(\sigma_i)^2], \quad (46)$$

where C is a constant, and it is assumed that all symbols (carriers) have the same power in the transmitter. So, according to equation (46), equation (45) can be transformed as follows:

$$\min \sum_{i,j} d(Sr_i / A_i, St_{ij})*SNR_i. \quad (47)$$

Based on equation (47), for two-dimensional signals, the corresponding soft decision metrics can be presented as follows: the average Euclidean distance metric is $$d_{ib0}=SNR_i*\Sigma(X_i/A_i-X_{ib0})^2+(Y_i/A_i-Y_{ib0})^2, \quad (48)$$

$$d_{ib1}=SNR_i*\Sigma(X_i/A_i-X_{ib1})^2+(Y_i/A_i-Y_{ib1})^2, \quad (49)$$

and the minimum Euclidean distance metric is $$d_{ib0}=SNR_i*\min \left[(X_i/A_i-X_{ib0})^2+(Y_i/A_i-Y_{ib0})^2\right], \quad (50)$$

$$d_{ib1}=SNR_i*\min \left[(X_i/A_i-X_{ib1})^2+(Y_i/A_i-Y_{ib1})^2\right]. \quad (51)$$

Thus, the proposed method of soft decision decoding which is based on weighted distance functions between the scaled received signals and the reference signals, can be easy implemented for any channel model.

A special simulation program to estimate the efficiency of the methods of the invention was developed. The program corresponds to a WLAN system according to the IEEE 802.11a standard. The system uses OFDM technology with forty-eight carriers, QAM modulation and binary convolution coding. The program contains a random data generator, a convolutional encoder with ½ redundancy, an interleaver, a QAM mapper, an AWGN channel model, a soft decision demodulator, a deinterleaver, a Viterbi soft decision decoder, and BER (bit error rate), and BLER (block error rate) calculation units. To estimate the performance gain of the methods of the invention, each data block, subjected to AWGN, was processed with two algorithms: a Viterbi algorithm with the conventional unweighted distance metric, and a Viterbi algorithm with the proposed weighted distance metric. For simulation of selective fading, some carriers were transmitted with additional attenuation. The first block of stochastic modeling corresponds to the situation when the carriers numbered 25 through 48 are transmitted with additional attenuation in comparison with carriers numbered 1 through 24. The results of stochastic modeling are presented in FIGS. 5–11.

FIG. 5 shows BER vs SNR for BPSK modulation and the unweighted distance metric with 1, 2, 3, 4 and 6 dB attenuation. Solid lines correspond to uncoded data transmission. One skilled in the art can see in this case that the signal attenuation decreases performance considerably, and at 6 and 0 dB attenuation the coded system does not practically have performance gain in comparison with the uncoded system.

Figure 6:
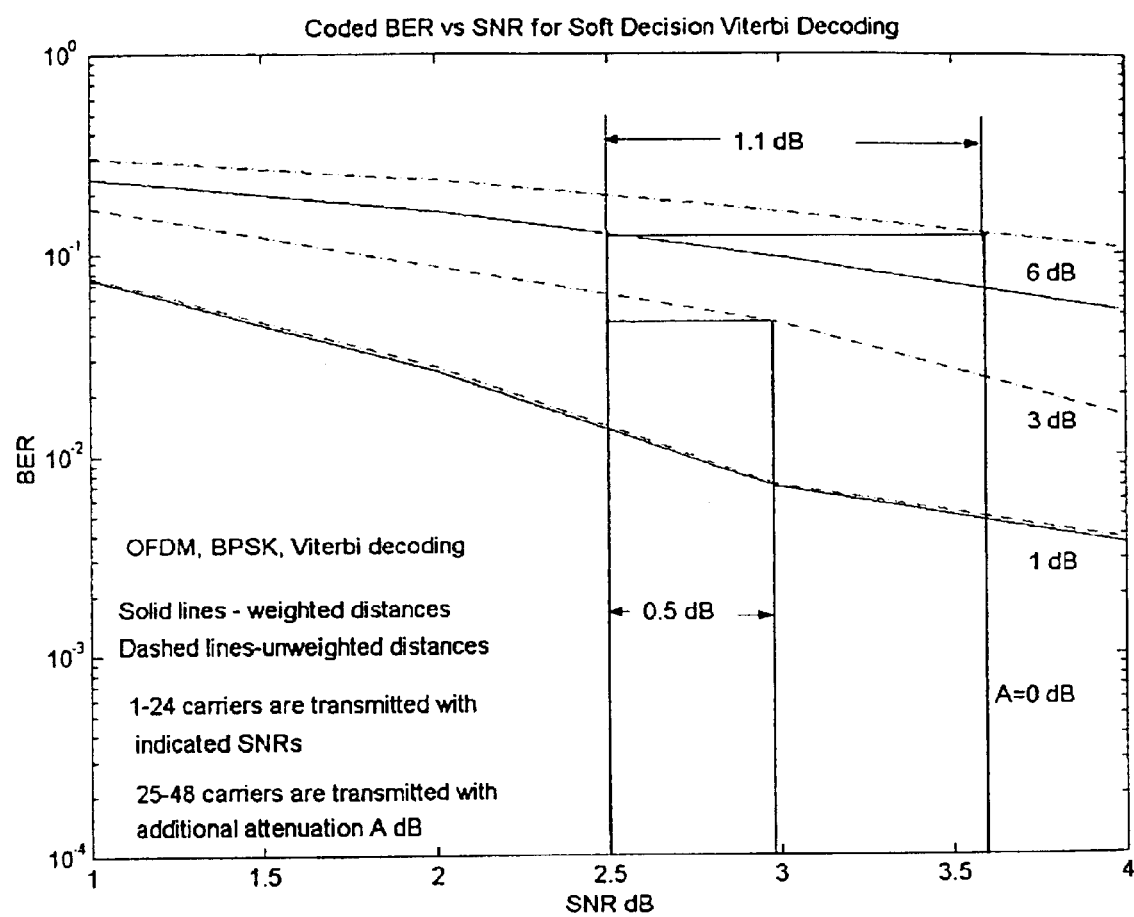
FIG. 6 shows the comparative performances for BPSK modulation when using weighted and unweighted distance metrics for 1, 3 and 6 dB attenuation.

FIG. 6 shows the comparative performances for BPSK modulation when using weighted and unweighted distance metrics for 1, 3 and 6 dB attenuation. Within the considered BER area, the proposed method provides about 1 dB gain at 6 dB attenuation and about 0.5 dB gain at 3 dB attenuation.

Figure 7:
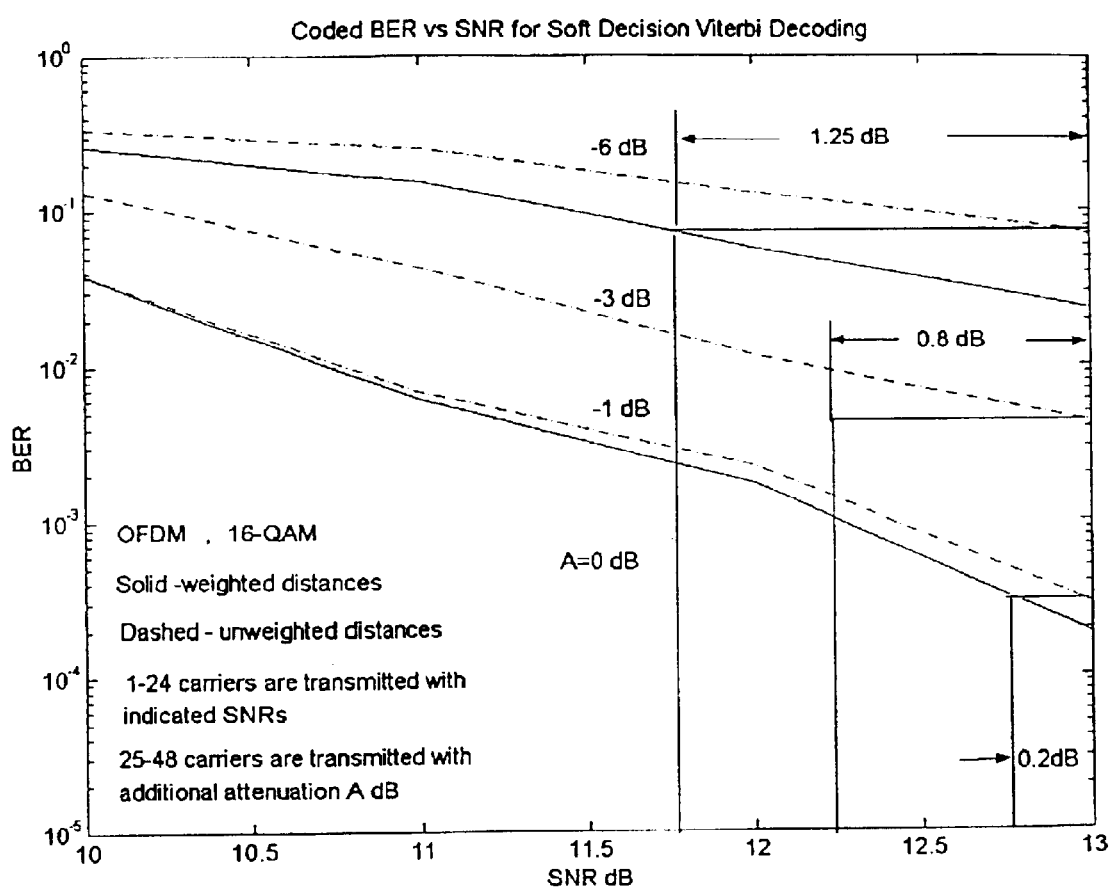
FIG. 7 shows the comparative performances for 16-QAM modulation when using weighted and unweighted distance metrics for 1, 3 and 6 dB attenuation.

FIG. 7 shows the comparative performances for 16-QAM modulation when using weighted and unweighted distance metrics for 1, 3 and 6 dB attenuation. Within the considered BER area, the proposed method provides 1.2 dB gain at 6 dB attenuation, 0.8 dB gain at 3 dB attenuation and 0.2 dB gain at 1 dB attenuation.

Figure 8:
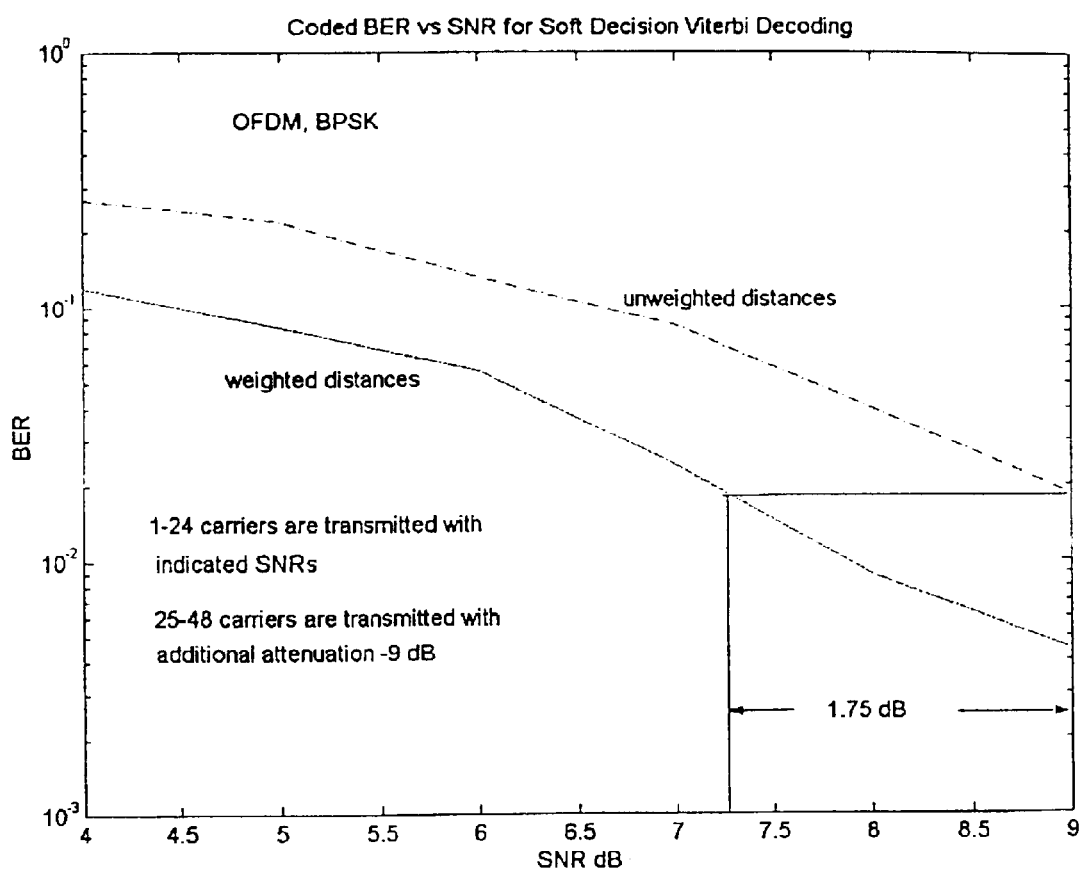
FIG. 8 shows the performance gain of BPSK modulation with utilization of weighted distance metrics for 9 dB attenuation.
Figure 9:
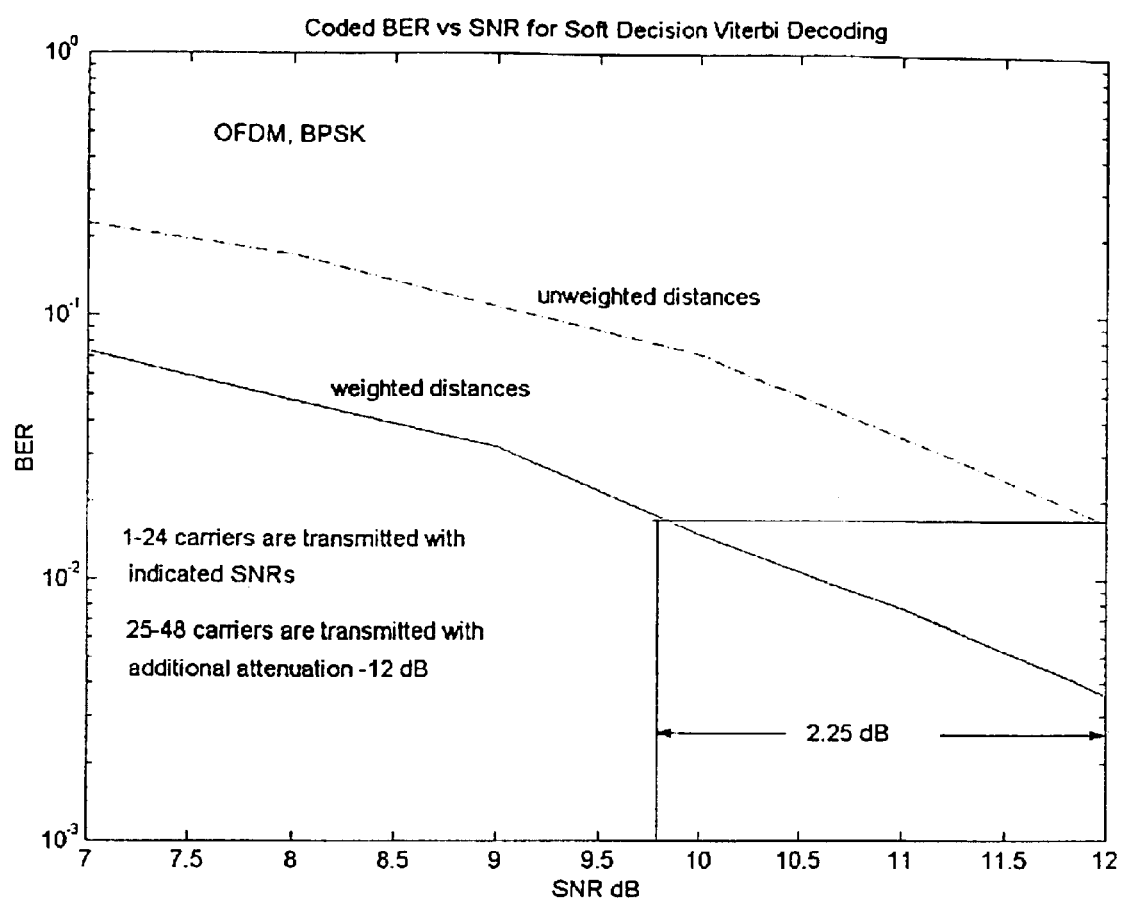
FIG. 9 shows the performance gain of BPSK modulation with utilization of weighted distance metrics for 12 dB attenuation.
Figure 10:
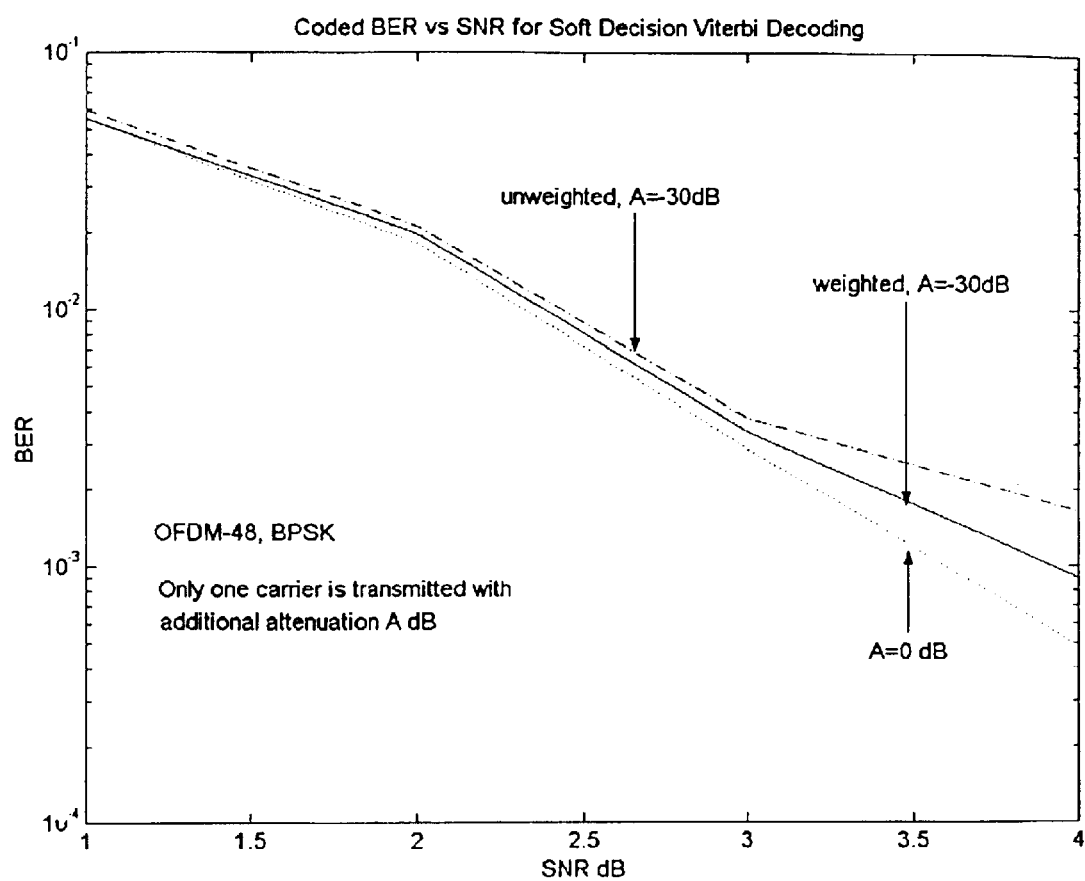
FIGS. 10–16 show the performance gain of BPSK modulation when 1, 2, 3, 4, 6, 8, and 16 carriers of the OFDM signal respectively are completely suppressed.
Figure 11:
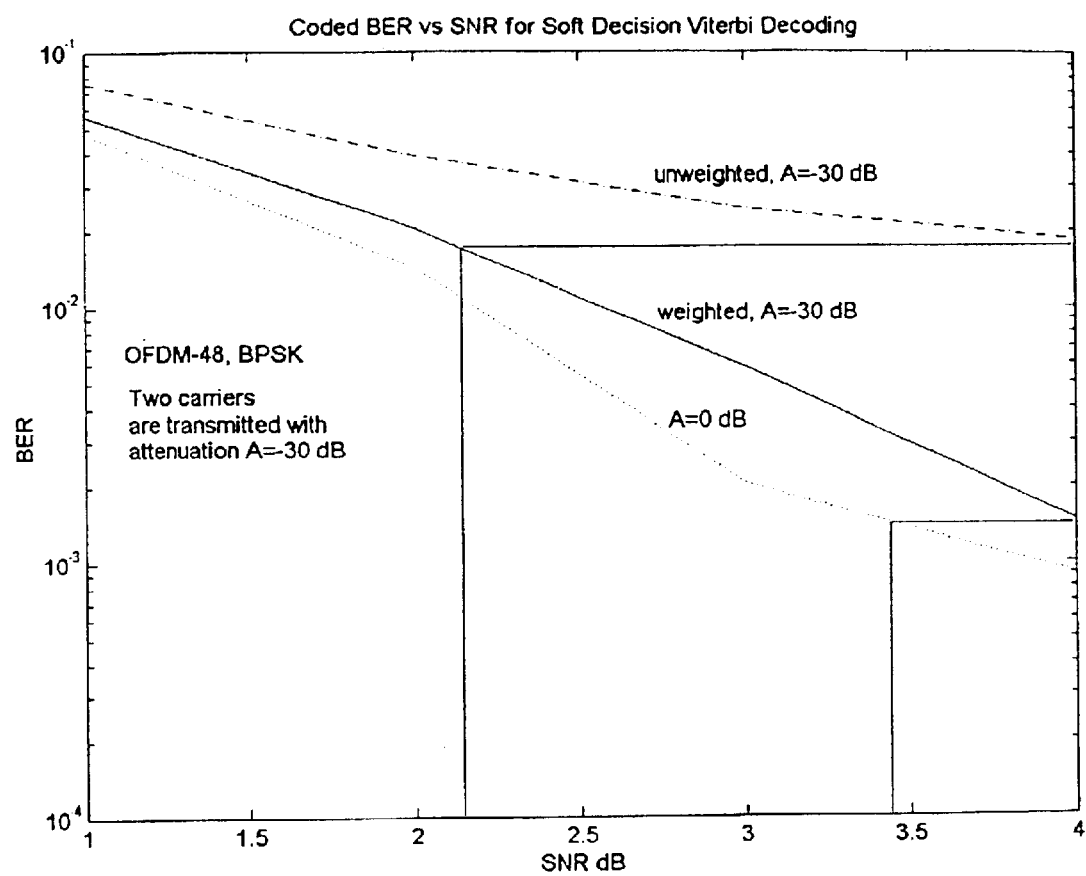
Figure 12:
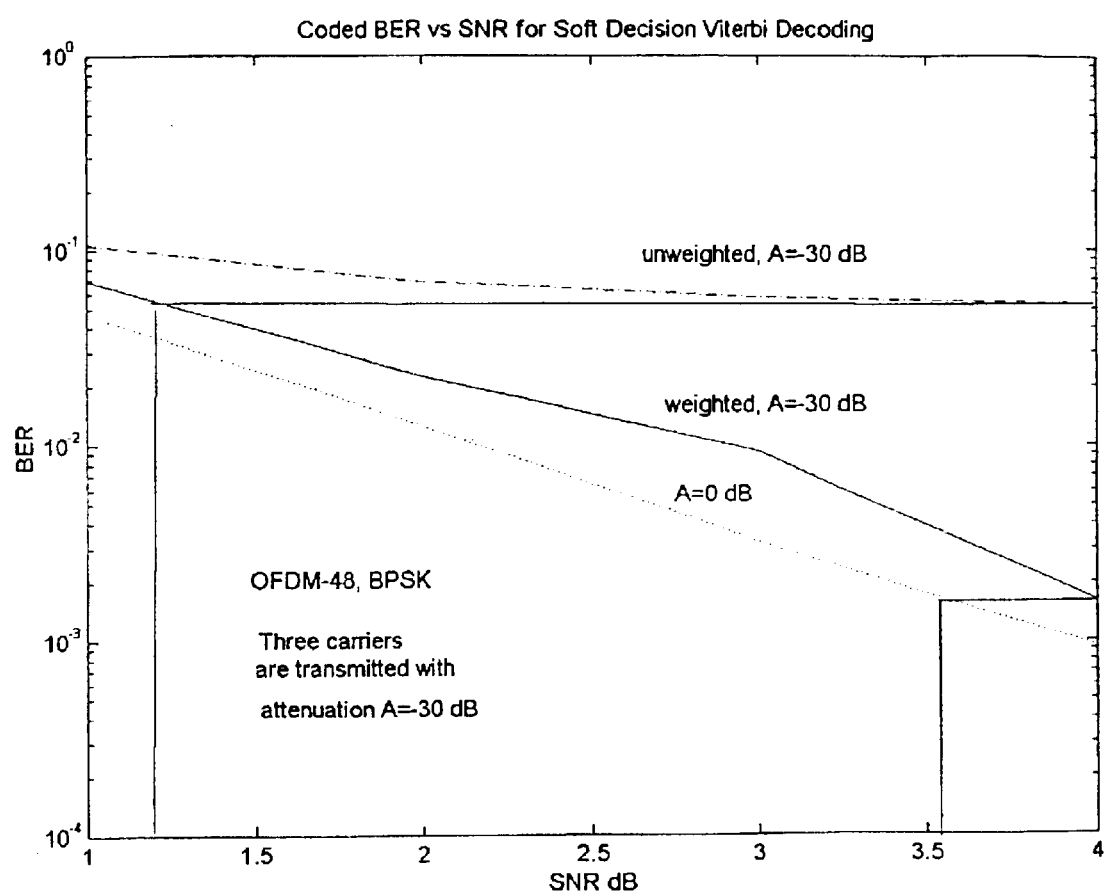
Figure 13:
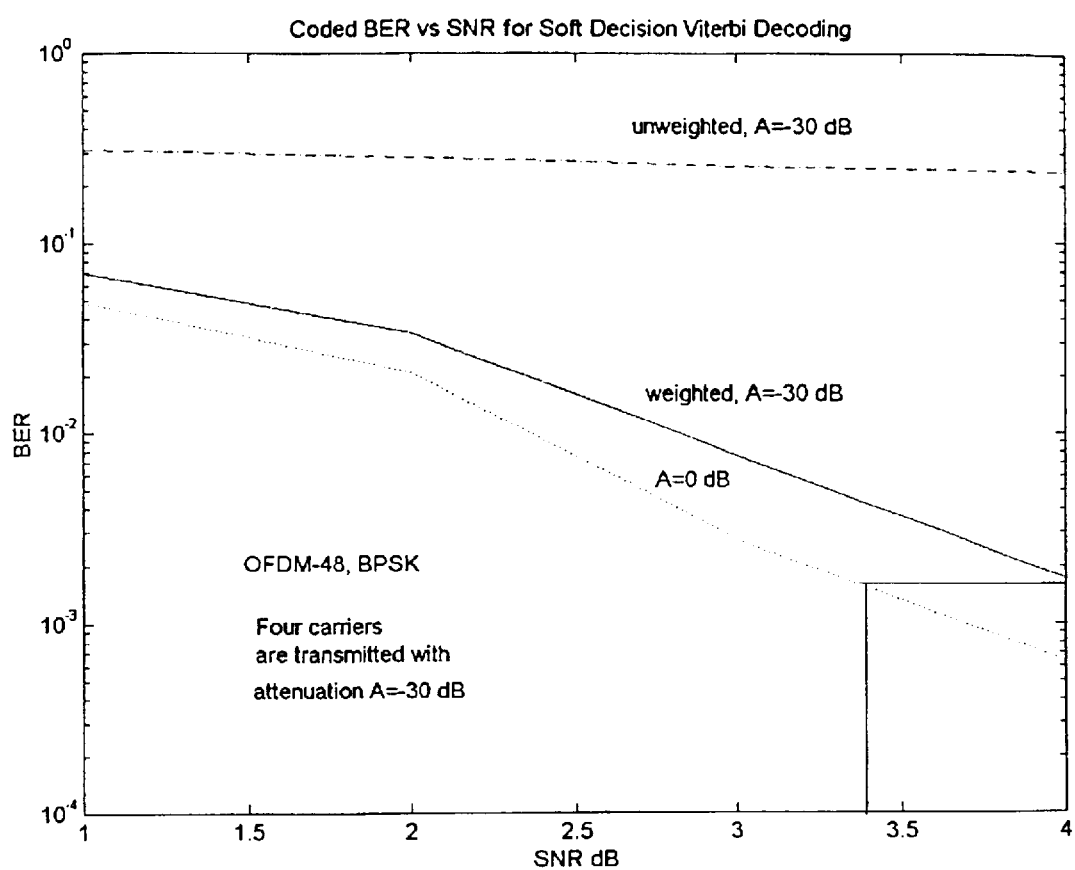
Figure 14:
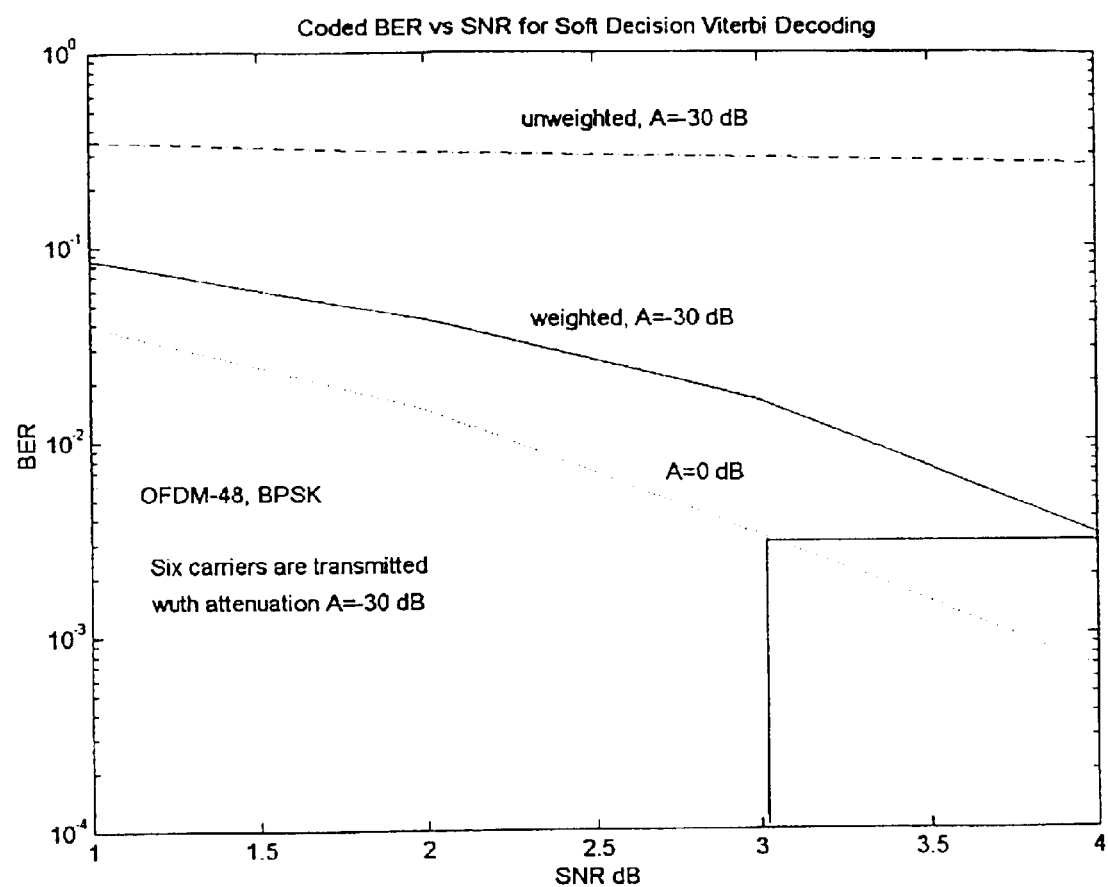
Figure 15:
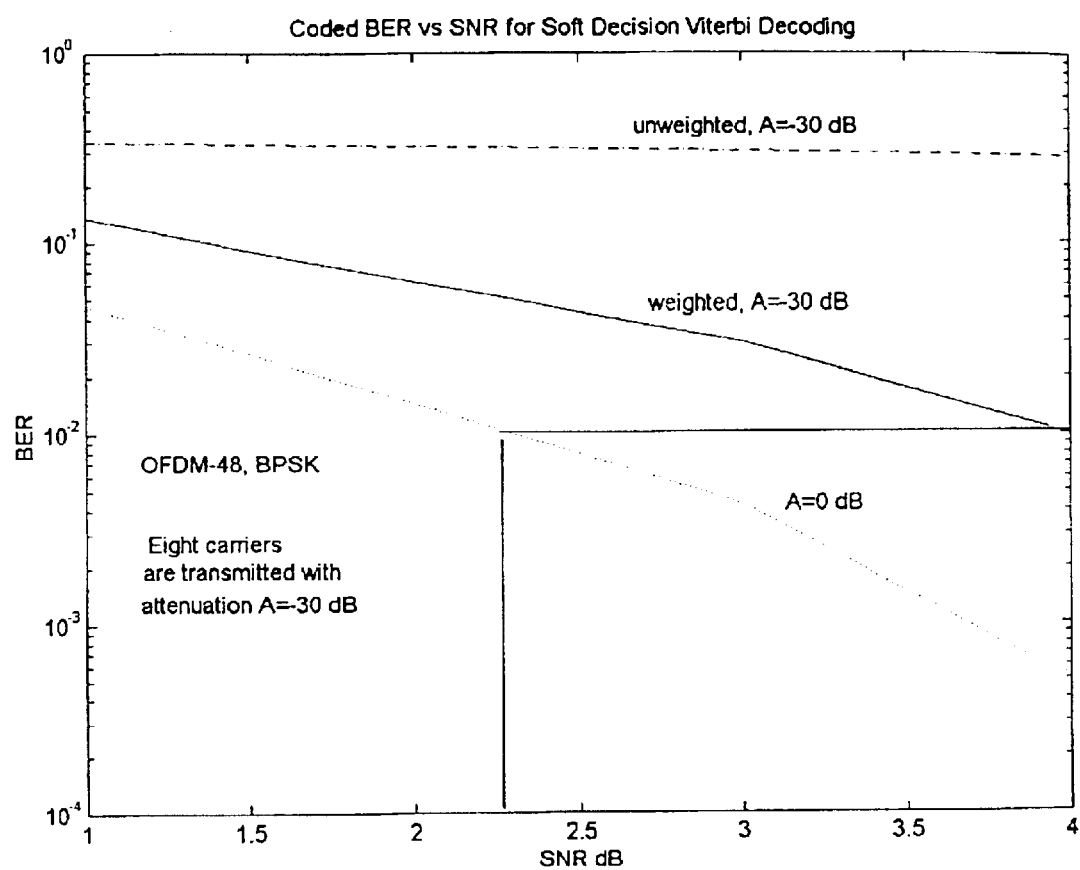
Figure 16:
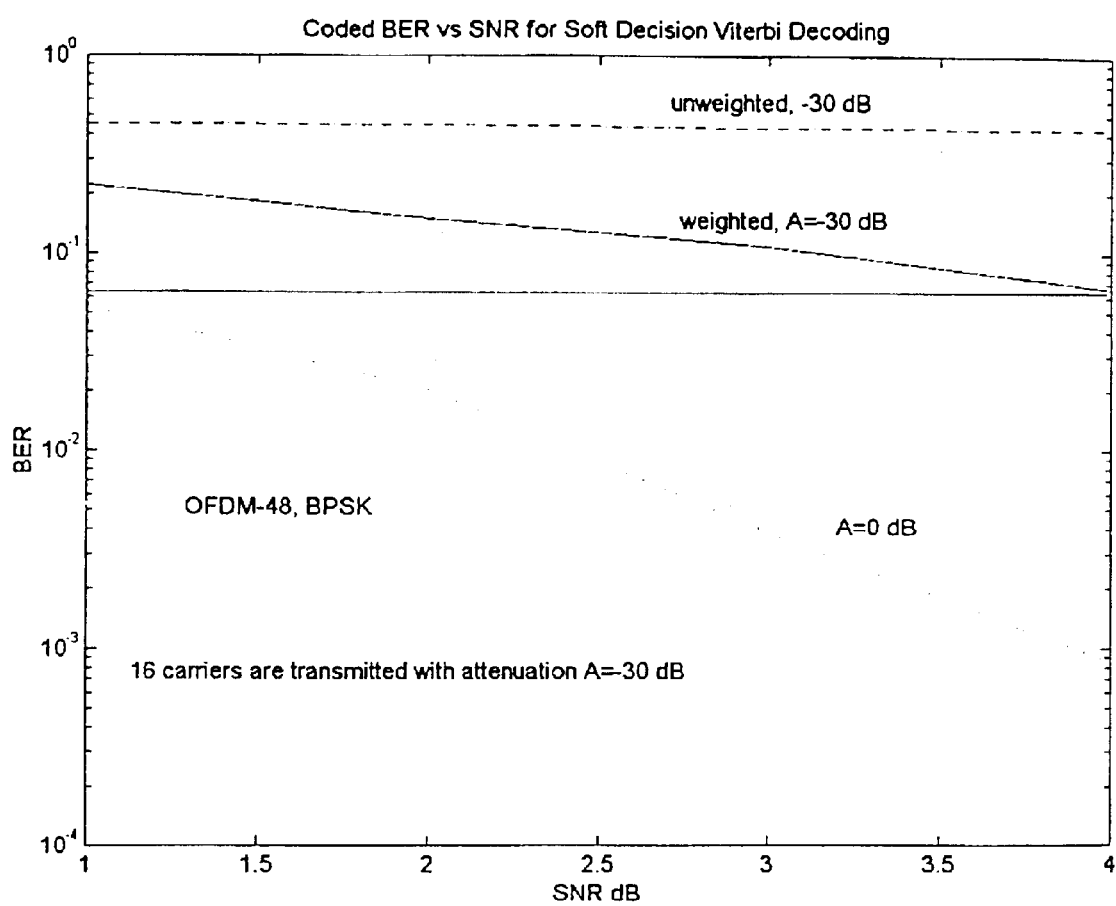

FIGS. 6 and 7 illustrate performance gain for comparatively low attenuation. In channels with deep fading, the performance gain increases. The last statement is illustrated by results of stochastic modeling shown in FIGS. 8 and 9. In particular, FIG. 8 shows the performance gain of BPSK modulation with utilization of weighted distance metrics for 9 dB attenuation; the gain is equal to 1.75 dB in this case. FIG. 9 shows the performance gain of BPSK modulation with utilization of weighted distance metrics for 12 dB attenuation; the gain is equal to 2.25 dB in this case. So, as can be seen, the utilization of weighted distances as a metric for the Viterbi soft decision decoding procedure improves considerably the system performance compared to utilization of unweighted distances. For OFDM systems the improvement increases with the increase of difference between carrier attenuation, and can exceed several dB in equivalent SNR.

Very impressive results have also been obtained when several carriers of the OFDM signal are completely suppressed. These results are shown in FIGS. 10–16 for 1, 2, 3, 4, 6, 8 and 16 suppressed carriers, respectively. In all cases the corresponding number of carriers (from a set of 48 carriers) were transmitted with 30 dB attenuation. In all the figures dotted lines correspond to carrier transmission without any attenuation (A=0). In these cases all carriers are transmitted with the indicated SNR.

Analysis of the results of FIGS. 10–16 shows that, when using weighted distances, suppression of 1, 2, 3, 4 or even 6 carriers does not destroy the system as the energy loss is about 0.5–1.0 dB. On the other hand, when using unweighted distances, suppression of two carriers causes about 2 dB loss, and suppression of three or more carriers destroys the system completely as the coding does not provide any gain. Suppression of eight and more carriers causes considerable energy loss for both weighted and unweighted distance metrics.

The proposed method also has been tested with full scale simulation of an IEEE 802.11a system, including a model of a multipath channel with selective fading. The test included about 1000 independent sessions, and each session has contained 17608 information bits, transmitted with 64 QAM modulation and ¼ redundant convolution code. During each session the received signal was processed in parallel with both the unweighted and weighted metrics. It should be noted that the test was deliberately provided with very severe conditions: 64 QAM, low code redundancy, long information blocks, up to 30 paths with independent lognormal fading, and SNR=25 dB (for channels without fading).

Figure 17:
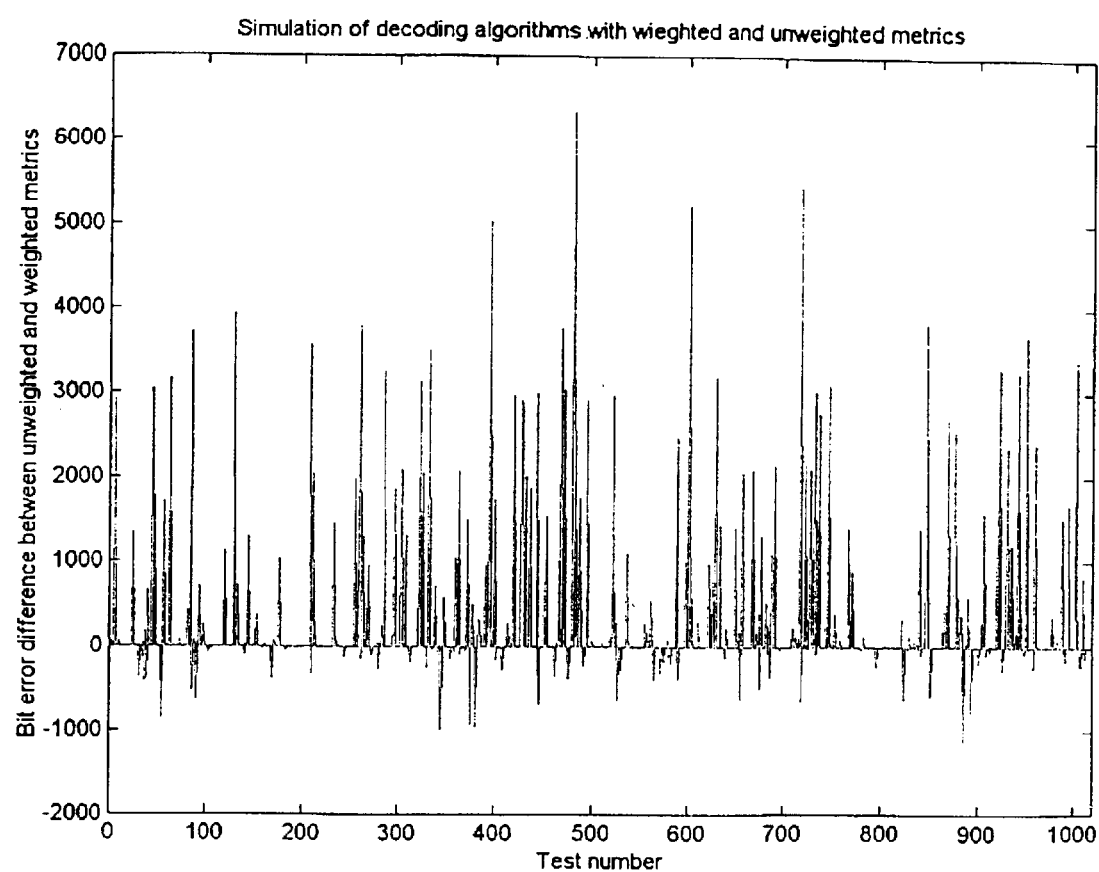
FIG. 17 shows tests which provide differences between erroneous bits for unweighted decoding and erroneous bits for weighted decoding.

FIG. 17 shows results of the test differences between erroneous bits for unweighted decoding and erroneous bits for weighted decoding. It is clear that the error balance is definitely in favor of the weighted decoding. Performance can be estimated as follows:

Bit error rate for unweighted decoding: $BERunw=5*10^{-2}$

Bit error rate for weighted decoding: $BERw=3*10^{-2}$

Block error rate for unweighted decoding: $BLERunw=0.36$

Block error rate for weighted decoding: $BLERw=0.33$

In the severe test conditions, the unweighted decoding provided 361 erroneous blocks of 1013 transmitted blocks, and 32 of them were corrected by the weighted decoding. On the other hand, the weighted decoding provided 336 erroneous blocks, and only 7 of them were corrected by unweighted decoding. So, on balance, the weighted decoding algorithm was superior, with an estimated block error correction improvement of 25/361=6.9%.

It will be appreciated by those skilled in the art that the transmitter 20 and receiver 30 described above may be used in many different types of systems. For example, a system may utilize multiple transmitters and multiple receivers, a single transmitter and multiple receivers, or even a single receiver and multiple transmitters. Typically, transmitters and receivers are found in a single unit which are said to include codecs; although the term codec is used loosely in those applications to describe the transmitter and receiver as opposed to just the coder of the transmitter and the decoder of the receiver. It should be appreciated by those skilled in the art that the present invention and various preferred aspects of the present invention may be utilized in the receiver (decoder) of any of these systems.

There have been described and illustrated methods, apparatus, and systems where received telecommunications signals are scaled, and a distance function between the scaled signals and reference signals are weighted for participation in a soft decision decoding procedure. While particular embodiments of the invention have been described, it is not intended that the invention be limited thereto, as it is intended that the invention be as broad in scope as the art will allow and that the specification be read likewise. Thus, while particular soft decision decoding algorithms have been disclosed, it will be appreciated that the invention can be utilized with other SDD algorithms as well. Also, while the invention was described with respect to certain preferred aspects which reduce the number of calculations required, it will be appreciated that the invention in its broadest sense may be utilized without those preferred aspects. Further, while the invention was shown in block diagram format, it will be appreciated that the block diagram may be representative of and implemented by hardware, software, firmware, or any combination thereof. Moreover, the functionality of certain aspects of the block diagram can be obtained by equivalent or suitable structure. For example, instead of an IFFT and an FFT, other Fourier transform means could be utilized. It will therefore be appreciated by those skilled in the art that yet other modifications could be made to the provided invention without deviating from its spirit and scope as claimed.

We claim:

1. A telecommunications receiver, comprising:

a) receiving means for receiving telecommunications signals from at least one carrier and for generating indications of received signal points for the at least one carrier;

b) equalizer means coupled to said receiving means for scaling said indications of received signal points;

c) distance function calculation means coupled to said equalizer means for determining indications of distances between the scaled indications and reference signals;

d) weighting means coupled to said distance function calculation means for multiplying said indications by corresponding weight coefficients to provide weighted distance indications;

e) a soft decision decoder coupled to said weighting means for using said weighted distance indications in providing determinations of data bit values.

2. A telecommunications receiver according to claim 1, wherein:

said weight coefficients are squared scaling factors.

3. A telecommunications receiver according to claim 2, wherein:

said squared scaling factors correspond to scaling factors utilized by said equalizer means.

4. A telecommunications receiver according to claim 1, wherein:

said weight coefficients correspond to inverse noise power spectral densities or carrier signal-to-noise ratios.

5. A telecommunications receiver according to claim 1, wherein:

said indications of distances are indications of one of average distances, average squared distances, minimum distances, and minimum squared distances between said scaled indication and all said reference signals corresponding to 0 or 1 for each bit of a binary combination in which said received signal is mapped.

6. A telecommunications receiver according to claim 1, wherein:

said receiving means includes a channel interface for receiving said telecommunications signals from said at least one carrier, and Fourier transform means for receiving an output of said channel interface and for generating said indications.

7. A telecommunications receiver according to claim 6, wherein:

said Fourier transform means is a Fast Fourier Transform (FFT) which calculates two numbers $X_{Fi}$, $Y_{Fi}$ for each carrier which are coordinates of the received signal point in two-dimensional space or real and imaginary parts of a complex number which reflect carrier phase and amplitude.

8. A telecommumcations receiver according to claim 7, wherein:

said equalizer means adjusts the numbers $X_{Fi}$, $Y_{Fi}$ to reference signals in such a way that without noise the received signal is equal to one of the reference signals.

9. A telecommunications receiver according to claim 8, wherein:

said equalizer means transforms said numbers into pair of coordinates $X_i A_i$, $Y_i/A_i$, i=1,2, . . . , where $A_i$ is a scaling factor for the i'th carrier.

10. A telecommunications receiver according to claim 9, wherein said scaling factor is equal to channel gain for the i'th carrier.

11. A telecommunications receiver according to claim 1, wherein:

said equalizer means is a frequency equalizer means for adjusting the phase and amplitude of said indications of received signal points.

12. A telecommunications receiver according to claim 6, further comprising:

f) a carrier gain estimation block coupled to said channel interface and to said Fourier transform means and which receives said output of said channel interface and said indications of received signal points and estimates carrier gain therefrom, wherein said equalizer means is a frequency equalizer means which is coupled to said Fourier transform means and to said carrier gain estimation block for adjusting the phase of said indications of received signal points.

13. A telecommunications receiver according to claim 12, wherein:

said weighting means is coupled to said carrier gain estimation means.

14. A telecommunications receiver according to claim 1, wherein:

said distance function calculation means includes a tabulation of coordinates of closest constellation points.

15. A telecommunications receiver according to claim 14, wherein:

said distance function calculation means includes means of finding minimum distances between said received signal and constellation points or minimum squared distances between said received signal and constellation points.

16. A telecommunications receiver according to claim 1, wherein:

said soft decision decoder includes means for decoding according to $$\min_{i,j} \sum d(Sr_i, A_i^* St_{ij})/(\sigma_i)^2,$$

where $d(Sr_i, A_i^* St_{ij})$ is a squared Eucidian distance between $Sr_i$ and $A_i^* St_{ij}$, $A_i$ is a gain or attenuation coefficient determined by said equalizer means, Sr is a sequence of said received telecommunications signals, St is a sequence of transmitted signals ultimately received by said telecommunications receiver as Sr, $(\sigma_i)^2$ is a noise variance for the i'th telecommunications signal, and $$\min_{i,j} \sum$$

is the minimum summation over all i and j.

17. A telecommunications system, comprising:

a) a transmitter including a binary encoder which encodes data bits, mapper means coupled to said binary encoder for combining said encoded data bits into at least one binary combination and mapping them into a symbol, and a channel transmission interface; and b) a receiver including
   (i) receiving means for receiving telecommunications signals from at least one carrier and for generating indications of received signal points for the at least one carrier,
   (ii) an equalizer means coupled to said receiving means for scaling said indications of received signal points,
   (iii) distance function calculation means coupled to said equalizer means for determining indications of distances between the scaled indications and reference signals,
   (iv) weighting means coupled to said distance function calculation means for multiplying said indications by corresponding weight coefficients to provide weighted distance indications, and
   (v) a soft decision decoder coupled to said weighting means for using said weighted distance indications in providing determinations of data bit values.

18. A telecommunications system according to claim 17, wherein:
   said binary coder is one of a convolution encoder, a Turbo code encoder and an LDPC encoder.

19. A telecommunications system according to claim 18, wherein:
   said transmitter further includes an inverse fast Fourier transformer coupled between said mapper means and said channel transmission interface.

20. A telecommunications system according to claim 19, wherein:
   said mapper produces N complex numbers which are applied to said inverse fast Fourier transformer.

21. A telecommunications system according to claim 17, wherein:
   said transmitter and said receiver are co-located.

22. A telecommunications system according to claim 17, wherein:
   said transmitter and said receiver are located at different locations, and said channel interface of said transmitter matches transmitted signals to said at least one carrier.

23. A telecommunications system according to claim 17, wherein:
   said weight coefficients are squared scaling factors.

24. A telecommunications receiver according to claim 23, wherein:
   said squared scaling factors correspond to scaling factors utilized by said equalizer means.

25. A telecommunications receiver according to claim 17, wherein:
   said weight coefficients correspond to inverse noise power spectral densities or carrier signal-to-noise ratios.

26. A telecommunications receiver according to claim 17, wherein:
   said indications of distances are indications of one of average distances, average squared distances, minimum distances, and minimum squared distances between said scaled indication and all said reference signals corresponding to 0 or 1 for each bit of a binary combination in which said received signal is mapped.

27. A telecommunications receiver according to claim 17, wherein:
   said receiving means includes a channel interface for receiving said telecommunications signals from said at least one carrier, and Fourier transform means for receiving an output of said channel interface and for generating said indications.

28. A telecommunications receiver according to claim 27, wherein:
   said Fourier transform means is a Fast Fourier Transform (FFT) which calculates two numbers $X_{Fi}$, $Y_{Fi}$ for each carrier which are coordinates of the received signal point in two-dimensional space or real and imaginary parts of a complex number which reflect carrier phase and amplitude.

29. A telecommunications receiver according to claim 28, wherein:
   said equalizer means adjusts the numbers $X_{Fi}$, $Y_{Fi}$ to reference signals in such a way that without noise the received signal is equal to one of the reference signals.

30. A telecommunications receiver according to claim 29, wherein:
   said equalizer means transforms said numbers into pair of coordinates $X_i/A_i$, $Y_i/A_i$, i=1,2, ..., N, where $A_i$ is a scaling factor for the i'th carrier.

31. A telecommunications receiver according to claim 30, wherein
   said scaling factor is equal to channel gain for the i'th carrier.

32. A telecommunications receiver according to claim 31, wherein:
   said equalizer means is a frequency equalizer means which is coupled to said Fourier transform means and to said carrier gain estimation block for adjusting the phase and amplitude of said indications of received signal points.

33. A telecommunications receiver according to claim 32, further comprising:
   (vi) a carrier gain estimation block coupled to said channel interface and to said Fourier transform means and which receives said output of said channel interface and said indications of received signal points and estimates carrier gain therefrom.

34. A telecommunications receiver according to claim 33, wherein:
   said weighting means is coupled to said carrier gain estimation means.

35. A telecommunications receiver according to claim 17, wherein:
   said distance function calculation means includes a tabulation of coordinates of closest constellation points.

36. A telecommunications receiver according to claim 35, wherein:
   said distance function calculation means includes means of finding minimum distances between said received signal and constellations points or minimum squared distances between said received signal and constellations points.

37. A telecommunications receiver according to claim 17, wherein:
   said soft decision decoder includes means for decoding according to $$\min_{i,j} \sum d(Sr_i, A_i^* St_{ij})/(\sigma_i)^2,$$

where $d(Sr_i, A_i^* St_{ij})$ is a squared Euclidian distance between $Sr_i$ and $A_i^* St_{ij}$, $A_i$ is a gain or attenuation coefficient determined by said equalizer means, Sr is a sequence of said received telecommunications signals, St is a sequence of transmitted signals ultimately received by said telecommunications receiver as Sr, $(\sigma_i)^2$ is a noise variance for the i'th telecommunications signal, and $$\min_{i,j} \sum$$

is the minimum summation over all i and j.

38. A method for decoding telecommunications signals received on at least one carrier, comprising:
   a) generating indications of received signal points for the at least one carrier;
   b) scaling said indications of received signal points;
   c) determining indications of distances between the scaled indications and reference signals;
   d) multiplying said indications by corresponding weight coefficients to provide weighted distance indications;
   e) using said weighted distance indications to provide determinations of data bit values.

39. A method according to claim 38, wherein:
said weight coefficients are squared scaling factors.

40. A method according to claim 38, wherein:
said weight coefficients correspond to inverse noise power spectral densities or carrier signal-to-noise ratios.

41. A method according to claim 38, wherein:
said indications of distances are indications of one of average distances, average squared distances, minimum distances, and minimum squared distances between a scaled indication and all said reference signals corresponding to 0 or 1 for each bit of a binary combination in which said received signal is mapped.

42. A method according to claim 38, further comprising:
prior to said scaling, Fourier transforming said indications.

43. A method according to claim 38, further comprising:
adjusting the phase and amplitude of said indications of received signal points.

44. A method according to claim 43, further comprising:
prior to said scaling, estimating carrier gain and using said carrier gain in said scaling.

45. A method according to claim 38, wherein:
said determining indications of distances includes tabulating coordinates of closest constellation points.

46. A method according to claim 45, wherein:
said determining indications of distances includes finding minimum or minimum squared distances between the received signal and the constellation points.

47. A method according to claim 38, wherein:
said using said weighted distance indications to provide determinations of data bit values comprises decoding according to $$\min_{i,j} \sum d(Sr_i, A_i * St_{ij})/(\sigma_i)^2,$$

where $d(Sr_i, A_i*St_{ij})$ is a squared Euclidian distance between $Sr_i$ and $A_i*St_{ij}$, $A_i$ is a gain or attenuation coefficient, Sr is a sequence of said received telecommunications signals, St is a sequence of transmitted signals, $(\sigma_i)^2$ is a noise variance for the i'th telecommunications signal, and $$\min_{i,j} \sum$$

is the minimum summation over all i and j.

* * * * *